Oct. 26, 1965   R. H. ANDERSON   3,214,516
STORAGE TUBE AND ELECTRICAL READOUT
APPARATUS AND METHOD FOR SUCH TUBE
Filed Dec. 19, 1962                        2 Sheets-Sheet 1

ROBERT H. ANDERSON
INVENTOR.
BY
BUCKHORN, BLORE, KLARQUIST & SPARKMAN
ATTORNEYS

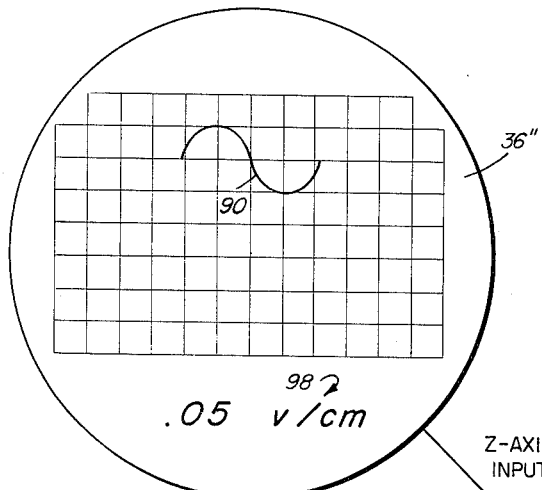
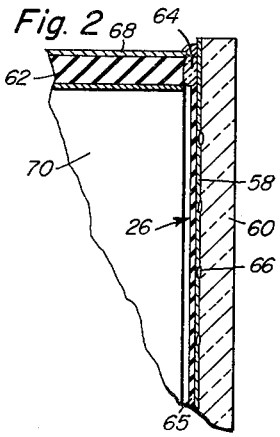
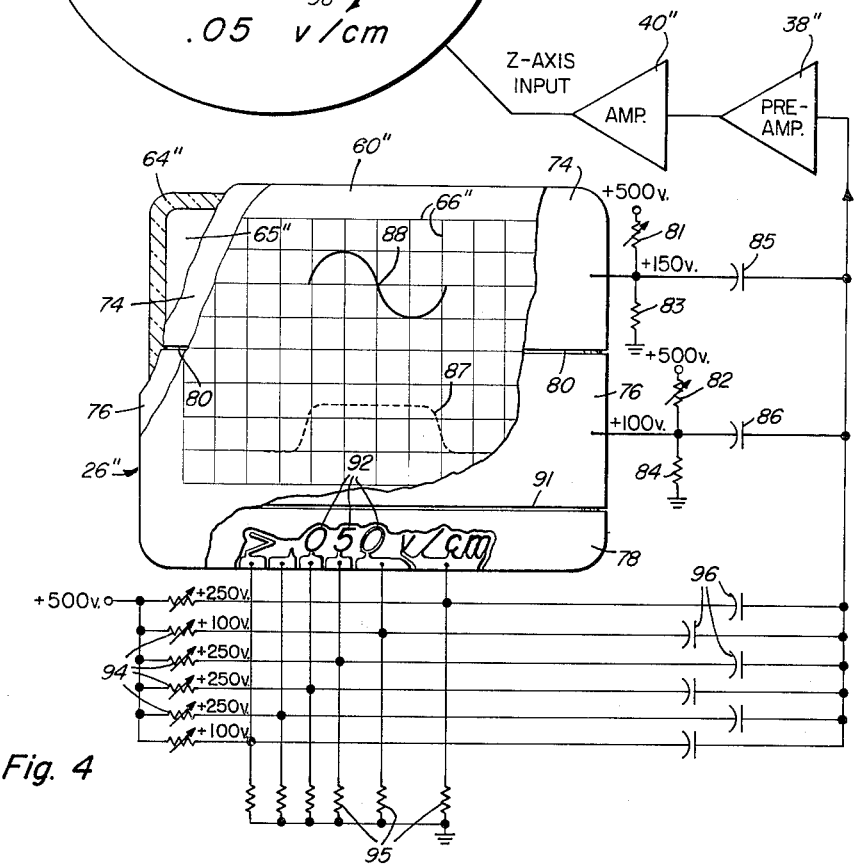
ROBERT H. ANDERSON
INVENTOR.
BY
BUCKHORN, BLORE, KLARQUIST & SPARKMAN
ATTORNEYS United States Patent Office 3,214,516
Patented Oct. 26, 1965

3,214,516
STORAGE TUBE AND ELECTRICAL READOUT
APPARATUS AND METHOD FOR SUCH TUBE
Robert H. Anderson, Portland, Oreg., assignor to Tektronix, Inc., Beaverton, Oreg., a corporation of Oregon
Filed Dec. 19, 1962, Ser. No. 245,716
13 Claims. (Cl. 178—6.8)

The subject matter of the present invention relates generally to cathode ray storage tubes, and in particular to bistable storage tubes of the direct viewing type which have both optical and electrical readout for indicating the charge image stored on a phosphor layer in the storage target of such tube, and to apparatus and method for obtaining electrical readout signals from a transparent conductive coating in such target.

The electrical readout apparatus and method of the present invention is especially useful when employed with a storage tube in a cathode ray oscilloscope radar or sonar apparatus or any other apparatus requiring either a remote visual indication of the image stored on such tube or a permanent record of such image. The storage tube of the present invention has a simplified target structure in which an integral layer of phosphor material is employed as the secondary emissive dielectric material of such target, along with a light, transparent, conducting coating beneath such phosphor layer, so that both a charge image and a light image are produced on such phosphor layer. The thickness of the phosphor layer is within a critical range of thicknesses within which the phosphor material can store a bistable charge image for an indefinite controllable time and such phosphor layer has a sufficiently porous structure to enable the transmission of secondary electrons which are emitted from one side of the layer and are collected by the conductive coating target electrode on the opposite side thereof. This direct viewing bistable storage tube is fully disclosed in my copending United States patent application Serial No. 180,457 filed March 19, 1962, entitled Electron Discharge Display Device, and in my copending United States patent application Serial No. 214,877, filed August 6, 1962, entitled Storage Tube, so that the structure of the storage tube will not be discussed in detail in this application.

An electrical readout signal, obtained by scanning the charge image on the phosphor layer of the storage target with a reading beam of electrons, may be transmitted from the conductive coating of the storage target to a television monitor or other display device in order to reproduce such image at a position remote from the storage tube. The storage tube and readout circuit of the present invention form an apparatus which has several advantages over conventional readout apparatus including the advantage that charge images of characters corresponding to the position of switches controlling the vertical gain and horizontal sweep speed of the storage tube may be stored on the target of such storage tube so that this information is transmitted by the readout signal to the television monitor tube and appears as corresponding character images on such monitor tube. Thus, the switch position units of the graticule scale of the storage tube are displayed upon the fluorescent screen of the monitor tube so that the characteristics of the stored wave form reproduced on the monitor tube may be read directly off such monitor tube, even though the dials of the switches in question cannot be seen. Another advantage of the readout apparatus and method of the present invention is that it can be employed to cause bistable storage of the high frequency transient signals which produce traces at a rate above the "writing rate" of the storage tube. This increase in storage range may be accomplished by scanning the reading beam over a temporary charge image corresponding to such transient signal produced on the storage target by the writing beam immediately after such temporary charge image is produced. An electrical readout signal thus obtained can be amplified and transmitted back to the control grid of the reading electron gun to modulate the current density of the reading beam in accordance with the temporary charge image. While the current density of the reading beam is normally not sufficient to cause bistable storage for an indefinite controllable time, the increase in beam density caused by the readout signal corresponding to the temporary charge image of the transient signal is sufficient to cause storage so that a relatively permanent charge image of the transient signal is produced. Thus, the apparatus of the present invention extends the storage range of a storage tube beyond the normal "writing speed" of such tube.

It is therefore one object of the present invention to provide an improved apparatus and method for obtaining an electrical readout signal from a storage tube which corresponds to the charge image on such tube.

Another object of the invention is to provide an improved apparatus for storing electrical signals as bistable charge images for an indefinite controllable time on a cathode ray storage tube, and reproducing such signals on a remote monitor device by transmitting an electrical readout signal corresponding to such stored charge image from the storage tube to the monitor device.

A further object of the present invention is to provide an improved direct viewing cathode ray storage apparatus in which a storage tube having a target in the form of a secondary emissive dielectric layer of phosphor material over a light transparent conductive coating is employed, along with an electrical circuit connected from such conductive coating to a remote monitor device in order to transmit electrical readout signals from such storage tube to such monitor device so that charge images stored on such phosphor layer can be reproduced on such monitor device.

An additional object of the invention is to provide an improved storage apparatus for storing electrical signals as charge images on a cathode ray storage tube while simultaneously producing character-shaped charge images on such storage tube, and for transmitting an electrical readout signal corresponding to such charge images from the storage tube to a remote monitor tube in order to reproduce such signals and characters on such monitor tube.

Still another object of the invention is to provide an improved storage apparatus for storing the wave form of an electrical input signal as a charge image on the storage target of a cathode ray storage tube along with character-shaped charge images corresponding to the positions of switches controlling the vertical gain and horizontal sweep speed of such storage tube, and for transmitting an electrical readout signal corresponding to the charge images to a remote monitor tube in order to reproduce the images of such input signal and such switch position characters on the monitor tube so that the characteristics of the input signal wave form can be determined from the monitor tube without examining the dials of such switches.

A still further object of the invention is to provide an improved method of operation of a bistable storage tube in order to increase the storage range of such tube beyond its writing rate for storing the charge image of high frequency transient signals for an indefinite controllable time.

Other objects and advantages of the present invention will be apparent from the following detailed description of certain preferred embodiments thereof and from the attached drawings of which:

FIG. 2 is an enlarged view of a portion of the storage target of the storage tube employed in the apparatus of FIG. 1;

FIG. 4 is a schematic diagram of a third embodiment of the storage apparatus of the present invention in which a different type of storage target is employed.

Figure 1:
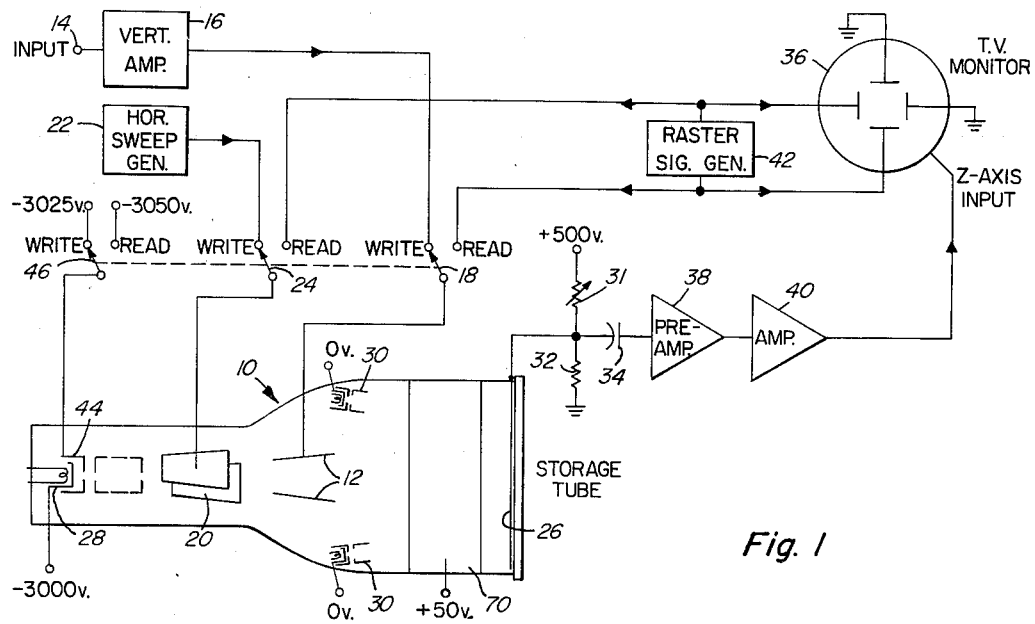
FIG. 1 is a schematic diagram of one embodiment of the storage apparatus of the present invention.

One embodiment of the storage apparatus of the present invention is shown in FIG. 1 to include a direct viewing, bistable storage tube 10 which is similar to the storage tube previously disclosed in my copending application Serial No. 180,457, referred to above, so that such tube will not be discussed in detail. The vertical deflection plates 12 of the storage tube are connected to the electrical input signals to be displayed which are applied to an input terminal 14 and transmitted through a vertical amplifier 16 and a selector switch 18 which is moved to the "write" position shown during the writing operation of the storage tube. At the same time, the horizontal deflection plates 20 of the storage tube are connected to a horizontal sweep generator 22 through a selector switch 24, which is ganged to switch 18, in order to apply a conventional ramp-shaped time base or linear sawtooth sweep signal to such horizontal deflection plates. A storage target 26 within the storage tube is bombarded by a writing beam of high velocity electrons which are emitted from a cathode 28. This writing beam is deflected by the horizontal and vertical deflection plates during the writing operation in order to produce an image of the input signal applied to input terminal 14 on the storage target 26.

If the current density of the writing beam emitted by cathode 28 is sufficient, the voltage difference between such cathode and the target 26 is high enough, and the sweep speed of the time base signal applied to the horizontal deflection plates 20 is slow enough, a bistable charge image of the input signal applied to the vertical deflection plates will be stored for an indefinite controllable time on the storage target 26 by uniformly bombarding the surface of such storage target with low velocity flood electrons emitted by flood guns 30. This bistable storage is caused in a conventional manner when the high velocity electrons of the writing beam strike the secondary emissive dielectric of the storage target 26 to provide regions of different potential on such dielectric which are positive and negative with respect to a critical voltage. When the D.C. bias voltage applied to the transparent conductive coating of the target is within a "stable range" of target voltages the phosphor layer will store a charge image. The bias voltage is applied to the storage target 26 by means of a variable bias resistor 31 connected in series with a fixed load resistor 32 between a D.C. voltage source of +500 volts to ground. The load resistor is connected to the conductive coating in such target in a manner hereafter described with reference to FIG. 2.

The "stable range" of target voltages may be defined as that range of voltages between "retention threshold voltage" below which storage is not possible, and a "fade-positive voltage" above which the storage target is driven into completely "written" or positive condition by the flood electrons so that a charge image is no longer possible. It should be noted that different thicknesses of phosphor material have different stable ranges. When the target voltage is within the stable range so that storage is possible, the writing beam produces negative and positive areas with respect to the critical voltage of the first crossover point on the secondary emissive characteristic curve of the phosphor material, on the dielectric layer of the storage target which are maintained or stored for an indefinite controllable time by the substantially uniform bombardment of such layer by the flood electrons. After the writing beam produces these negative and positive target areas, the holding action of the flood electrons maintains the charge image by driving the negative charge areas to a low voltage stable state near the potential of the flood gun cathode and by driving the positive voltage areas to a high voltage stable state near the potential of the conductive target coating. This bistable storage operation is more fully described in my previous application Serial No. 180,457.

As shown in FIG. 2, the storage target 26 includes a light transparent conductive coating 58 of tin oxide or other suitable conductive material, coated on the inner surface of a flat glass face plate 60 which is sealed to a ceramic funnel portion 62 of the storage tube envelope by a seal 64 of devitrified glass or other suitable material. A secondary emissive dielectric layer 65 of phosphor material is deposited over the conductive coating 58 as an integral phosphor layer. The phosphor layer has a thickness within a critical range of thicknesses over which the phosphor material can store a bistable charge image for an indefinite controllable time. The conductive coating 58 extends over graticule lines 66 of glass frit or other material deposited upon the inner surface of the face plate 60 to provide an internal graticule which may be illuminated by a light source positioned adjacent the outer edge of the face plate. This envelope structure is discussed in copending United States patent application Serial No. 132,915 entitled Electron Beam Display Device, filed on March 19, 1962, by Wilbanks et al.

In order to provide a connection from the exterior of the storage tube envelope to the conductive coating 58 inside such envelope, a portion of such conductive coating may be extended through the glass seal 64 up to the outer edge of the face plate 60. A lead coating 68 of silver or other suitable conductive material may be provided over the outer surface of the ceramic funnel 62 into contact with the conductive coating 58 in order to connect such conductive coating to the D.C. bias voltage across the load resistor 32. A wall coating 70 of silver or other suitable conductive material may be provided on the inner surface of the ceramic funnel 62 at a position closely spaced to the target 26. This wall coating may be connected to a bias voltage of +50 volts D.C. in order to focus and to collimate the flood electrons emitted by flood guns 30 so that such electrons are moving in a direction perpendicular to the plane of the phosphor layer 65 when they strike such phosphor layer. The secondary electrons emitted by the rear surface of the layer are collected in part by the wall coating 70 and in part by the target coating 58 since the semi-continuous nature of the phosphor layer allows these electrons to pass through such layer to the target coating. The phosphor layer may include a mixture of a good secondary emissive material such as magnesium oxide (MgO) in order to increase the writing speed of the storage target without decreasing the brightness and contrast of the light image produced by the phosphor material too greatly. It has been found that a mixture by weight of 25% magnesium oxide and 75% P–1 type phosphor increases the writing speed by a factor of 20 or more, to over 1 million centimeters per second while the brightness and contrast of the light image remain high. However, it should be noted that further increases in the amount of magnesium oxide may decrease the brightness and contrast below a satisfactory value, while merely increasing the writing speed by a further factor of 2 to 4.

The load resistor 32 connected to the conductive coating of the storage target 26 is also connected through a D.C. blocking or A.C. coupling capacitor 34 to control grid or other "Z-axis" input of a television or other monitor tube 36. An electrical readout current is produced on the conductive coating of the target by scanning the charge image stored on the phosphor layer of such target with a reading beam of electrons emitted by cathode 28 also. This readout current is converted into a readout voltage signal by load resistor 32 and is transmitted to the Z-axis input of the monitor tube in order to modulate the brightness of such monitor tube in accordance with the charge image. The readout signal is first transmitted through a transistor preamplifier 38 of low input impedance to eliminate noise pick-up in such signal, and then transmitted through a power amplifier 40 before being applied to the monitor tube. The horizontal and vertical deflection plates of the monitor tube 36 are connected in a conventional manner to a raster signal generator 42 which applies different frequency sawtooth signals to such deflection plates in order to scan the fluorescent screen of the monitor tube with television raster pattern. Thus, a vertical raster signal in the form of a 60 cycles per second sawtooth may be applied to the vertical deflection plates while a horizontal raster signal in the form of a 15,750 cycles per second sawtooth may be applied to the horizontal deflection plates of such monitor tube. During the electrical readout operation of the storage tube, selector switches 18 and 24 are moved to the "Read" position from the "Write" position shown in FIG. 1 in order to disconnect the deflection plates of such tube from the vertical amplifier 16 and the horizontal sweep generator 22, and to connect the deflection plates to the raster signal generator 42. This applies the vertical raster signal to the vertical deflection plates 12 of the storage tube and the horizontal raster signal to the horizontal deflection plate 20 of such tube and causes a reading electron beam produced by cathode 28 to be scanned across the phosphor layer of the storage target 26 in a raster pattern in synchronism with the monitor tube 36.

In order to prevent the reading beam from causing a raster pattern to be stored on the storage target during electrical readout, the control grid 44 of the storage tube 10 is switched to a more negative voltage by a selector switch 46 from that voltage applied to such control grid during writing. This reduces the current density of the reading beam below that of the writing beam so that, although the voltage difference between the cathode 28 and the storage target 26 or the velocity of the electrons in such reading beam is substantially the same as for the writing beam and a relatively slow horizontal raster is employed, the reading beam does not produce a stored image. Instead, the reading beam scans the charge images produced on the phosphor layer 65 of a storage target 26 to produce a readout signal on the conductive coating 58 of such storage target which corresponds to such charge images without changing these images. Thus, when the reading beam strikes "unwritten" or background areas of the phosphor layer, a positive readout voltage is produced across the load resistor 32. However, when the reading beam strikes a "written" area of the target, it produces a negative going voltage pulse across the load resistor. Therefore, the readout signal is in the form of a positive rectangular signal having a plurality of negative going spike portions which correspond to the time when the reading beam crosses a stored trace.

It should be noted that, since the storage tube 10 employs a single electron gun to produce both the writing beam and the reading beam, selector switches 18, 24 and 46 are required to allow time-sharing of such electron gun between the reading and writing operations. In addition, when the term "bias voltage" is used throughout this patent application, it refers to the quiescent or non-signal D.C. voltage with respect to ground applied to the electrode in question and not to the voltage difference between that electrode and a cathode. For example, when switch 46 is in the "Write" position shown, the bias voltage applied to the control grid 44 is −3025 volts while the voltage difference between the cathode 28 and such grid is +25 volts. Also, while blanking of the storage tube 10 during the flyback movement of its electron beam has not been discusssed, it is obvious that the storage tube may be provided with deflection blanking plates connected to still another selector switch ganged to the others so that the retrace portion of the horizontal sweep signal produces the blanking signal during "writing" and the retrace portion of the horizontal raster signal produces such blanking signal during "reading."

Figure 3:
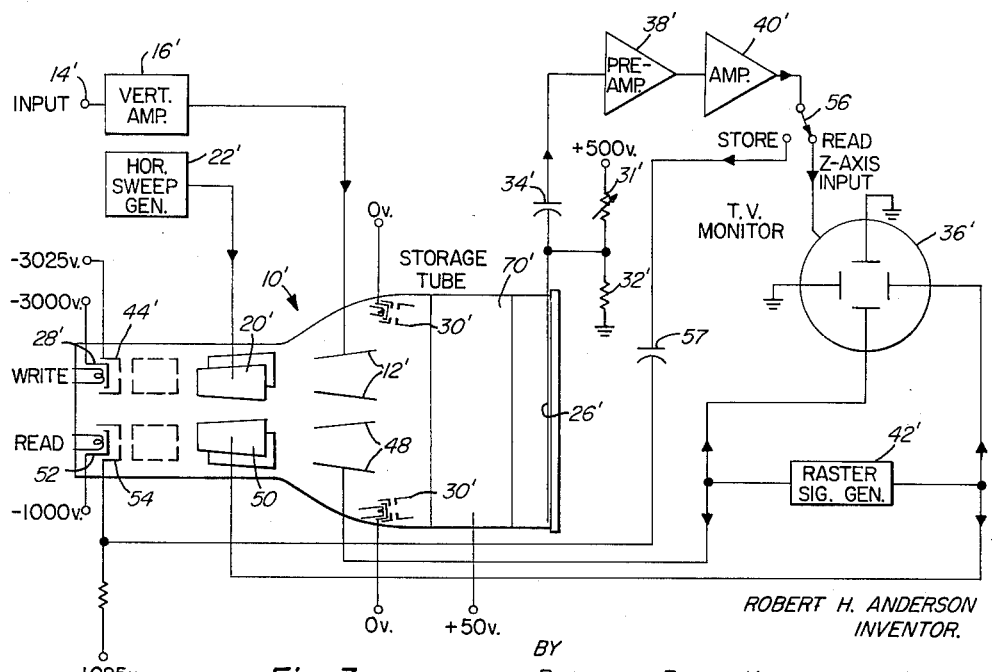
FIG. 3 is a schematic diagram of another embodiment of the storage apparatus of the present invention, similar to that shown in FIG. 1.

It may be desirable to employ a separate reading gun in the storage tube 10' having a cathode 52 which is connected to a more positive voltage than the cathode 28' of the writing gun, as shown in FIG. 3. This eliminates the need for the selector switches 18, 24 and 26 and enables simultaneous reading and writing operations so that an electrical readout signal can be obtained continuously during the operation of the storage tube 10'. The storage apparatus of FIG. 3 is similar to the apparatus of FIG. 1 so that the same numbers identify corresponding elements. For this reason, only the differences between the two apparatus will be described. The vertical deflection plates 48 of the reading gun are connected to the vertical raster signal produced by the raster signal generator 42' and the horizontal deflection plates 50 of such electron gun are connected to the horizontal raster signal produced by such generator. It should be noted that, while the cathode 52 of the reading gun is shown connected to a more positive voltage than the cathode 28' of the writing gun to prevent the reading beam from storing, it may be more convenient to connect both of these cathodes to the same potential and to provide the reading beam with a lower current density than the writing beam. In this event, the control grid 54 of the reading gun is connected to a more negative voltage than the control grid 54' of the writing gun in a similar manner to the selector switch 46 of FIG. 1.

The storage apparatus of FIG. 3 may be employed to store high frequency transient signals which are faster than the writing speed of the storage tube so that the writing beam merely produces a temporary charge image on the storage target and is not capable of causing bistable storage of such image for an indefinite controllable time without the additional step of operation hereafter described. If the output of the amplifier 40' is connected by means of a selector switch 56 through a blocking capacitor 57 to the control grid 54 of the reading gun by moving the switch to its "Store" position in order to transmit the readout signal to such control grid, the current density of the reading beam is increased in accordance with the readout signal until such reading beam produces a stored image on the target 26'. Thus, although the writing beam does not cause bistable storage of the transient signal, it does produce a temporary charge image of such transient signal on the storage target. When the reading beam scans such target, it produces a readout signal corresponding to the temporary charge image and transmits this readout signal back to the control grid 54 of the reading gun. In this manner, the readout signal will modulate the intensity of the reading beam to cause a charge pattern to be "written" on the storage target by the reading beam. This stored charge pattern and its corresponding light image is a reproduction of the transient signal. It should be noted that there is some time delay before the readout signal can be transmitted through the coupling capacitors 34 and 57 and amplifiers 38' and 40' to the control grid 54 so that the stored charge image would ordinarily be slightly displaced from that of the temporary charge image produced by the writing beam; however, this can be compensated for. Another method of achieving storage of a transient that causes only a temporary charge image would be incorporating the use of a second storage tube. The readout signal corresponding to the temporary charge image of the transient signal can be transmitted to a second storage tube system and stored in the normal fashion. This method thus eliminates the delay and displacement difficulty of the aforementioned method of storing transient wave forms.

Of course, the bias resistor 31 and 31' of FIGS. 1 and 3 are variable resistors so that the target voltage applied to conductive coating 58 can be varied to erase the charge image stored on the targets 26 and 26'. This is accomplished in a conventional manner by raising the target voltage above the "fade positive" voltage and then lowering such target voltage through the stable range of voltages to below the "retention threshold" voltage before returning it to a voltage within such stable range. Also, while the monitor tube 36' is shown connected to the readout signal amplifier 40' in the "Read" position of the switch 56 and disconnected from such amplifier in the "Store" position of such switch, it should be appreciated that the Z-axis input of the monitor tube may also be connected to the readout amplifier in the "Store" position of the switch so that a portion of the readout signal is transmitted simultaneously to the monitor tube and the reading gun of he storage tube. This would eliminate the necessity of switching back and forth between the two switch positions. Of course, the readout signal fed back to the reading gun may be applied to the cathode 52 of such gun, rather than the control grid 54, after inverting such readout signal since it is the potential difference between the cathode and control grid which determines the current density or brightness of the reading beam.

Another embodiment of the storage target and its associated readout circuit which may be employed with the storage tubes of FIG. 1 and FIG. 3 is shown in FIG. 4 which is described in detail in my copending United States patent application Serial No. 214,877, previously referred to. This storage target 26'' includes a plurality of spaced conductive areas 74, 76, and 78 in place of the conductive coating 58 of FIG. 2. The conductive areas 74 and 76 are insulatingly spaced by a narrow horizontal gap 80 in the conductive material so that the signal wave form display area is effectively split into two independent storage areas. Each of the conductive areas 74 and 76 is connected by a lead portion similar to that shown in FIG. 2, to a different source of positive D.C. bias voltage through variable bias resistors 81 and 82 which are connected to ground through load resistors 83 and 84, respectively. The load resistors 83 and 84 are connected through blocking capacitors 85 and 86, respectively to the monitor tube 36''. This enables the portions of phosphor layer 65'' overlying such conductive areas to be operated independently, either in a storage or a nonstorage mode, merely by varying the target voltage applied to the conductive coatings so that one of the target areas can be used as a previewing area for examining an unstored wave form before storing it on the other target area. In the position of the variable resistors 81 and 82 shown, +150 volts is applied to the upper conductive area 74 while +100 volts is applied to the lower conductive area 76. If the retention threshold for the particular thickness of phosphor layer is +125 volts, then a signal wave form 87 produced on the phosphor layer overlying the lower area 76 will not be stored, as indicated by the dashed lines, and will not be displayed on the monitor tube 36''. However, since the upper conductive coating 74 is connected to a voltage greater than the retention threshold voltage and within the stable range of target voltages, a signal wave form 88 produced on the phosphor layer overlying such conductive layer will be stored, as indicated by the solid line. The conductive coatings 74 and 76 are connected through coupling capacitors 85 and 86, respectively, to the Z-axis input of the monitor tube 36''. Therefore, the electrical readout signal produced by scanning the surface of the phosphor layer 65'' by the reading beam, will be transmitted to the monitor tube in order to produce a wave form 90 corresponding to the stored wave form 88.

As shown in my previous patent application Serial No. 214,877, the third conductive area 78 is spaced from area 76 by a gap 91 and may be divided into a plurality of spaced, character-shaped conductive areas 92, which are each connected through the glass seal of the storage tube by insulatingly spaced lead portions. Each of these character-areas is connected to a different source of positive D.C. bias voltage through a plurality of variable bias resistors 94 which are connected to ground through fixed load resistors 95. These bias resistors enable the character areas 92 to be connected to different target voltages of, for example, +250 or +100 volts D.C., which are respectively above the "fade positive" voltage and below the "retention threshold" voltage for the storage target. Thus, at the voltages shown, the phosphor layer portions above the character-shaped conductive areas ".05 v./cm." are completely "written" by the action of the flood electrons to produce a charge image and a similar light image corresponding to the shape of the character areas. This means that each centimeter unit on the vertical coordinate of the graticule scale 66'' equals .05 volt. However, the other character areas ">" and "0" cannot produce stored images when connected to target voltages shown. Since each of the character areas 92 is connected to the Z-axis input of the monitor tube 36'' through a separate blocking capacitor 96, a readout signal corresponding to the stored character images is transmitted to the monitor tube to produce a similar character display 98 on such monitor tube. This character display can be employed to indicate the position of switches which control the vertical gain (shown) and the horizontal sweep speed (not shown) of the writing gun in the storage tube. As a result, the units of the graticule scale of the storage tube are presented directly on the storage target and are also displayed on the monitor tube. This enables the observer of the monitor tube to determine the voltage and time characteristics of the stored wave form 90 without seeing the dials of the switches in question. It also enables any photographs which are taken of the wave form to be automatically labeled with the voltage and time units of such wave form.

Of course, the television monitor tube 36 and 36'' can be replaced by another storage tube, in order to store the reproduced wave form 90. Alternatively, an X-Y recorder or other electromechanical device may be used in place of the monitor tube. Of course, the readout signal from more than one storage tube may be applied to a single monitor tube so that wave forms may be observed side by side on the monitor tube for comparison. If this is done, the polarity of the readout signals can be reversed so that one signal is positive and produces a bright trace, while another signal is negative and produces a dark trace, in order to enable the observer to identify the source of the traces. Another advantage of the monitor tube is that it may be employed to magnify a portion of the stored wave form by scanning a portion of the storage target while sweeping the entire surface of the monitor tube. In addition, other scan patterns can be employed rather than the standard TV raster pattern, for example, a circular sweep pattern of the P.P.I. type used in radar may be employed.

It will be obvious to those having ordinary skill in the art that various changes may be made in the details of the above-described preferred embodiments of the present invention without departing from the spirit of the invention. Therefore, the scope of the present invention should be determined only by the following claims.

I claim:

1. Cathode ray storage apparatus having electrical readout, comprising:

a storage target which includes an integral layer of phosphor material supported over a light transparent, electrically conductive support member, said phosphor layer having a sufficiently porous structure that secondary electrons emitted from one side of said layer can be transmitted through said layer and collected by said conductive member on the opposite side thereof so that the phosphor material can store a charge image produced thereon for an indefinite controllable time;

writing means for bombarding said phosphor layer with high velocity writing electrons to establish a charge image on said phosphor layer by forming areas of different potential on said phosphor layer which are positive and negative of a critical voltage;

holding means for bombarding said phosphor layer with low velocity electrons in order to maintain said charge image on said phosphor layer when said writing electrons stop bombarding said phosphor layer; and readout means for moving a reading electron beam across the surface of the phosphor layer of said target in a regular pattern in order to produce an electrical readout signal on the conductive region of said support member, which corresponds to the charge image.

2. Cathode ray storage apparatus having electrical and optical readout, comprising:

a storage target which includes an integral layer of secondary emissive phosphor material over a light transparent conductive coating on the surface of a light transparent support of insulative material, said phosphor layer having a sufficiently porous structure that secondary electrons emitted from one side of said layer can be transmitted through said layer and collected by said conductive coating on the opposite side thereof so that the phosphor material can store a charge image for an indefinite controllable time;

writing means for bombarding said phosphor layer with a writing beam of high velocity electrons to establish a charge image on said phosphor layer by forming areas of different potential on said phosphor layer which are positive and negative of a critical voltage, and to produce a light image corresponding to said charge image;

holding means for bombarding said phosphor layer with low velocity electrons whose overall effect is to add more electrons to the negative target areas and to remove electrons from the positive target areas by secondary emission in order to maintain said charge image after said writing beam stops bombarding said areas; and readout means for moving a reading electron beam across the surface of the phosphor layer of said target in a regular pattern in order to produce a readout signal on the conductive coating of said target which corresponds to said charge image.

3. Cathode ray storage apparatus having electrical and optical readout, comprising:

a storage target which includes an integral layer of phosphor material over a light transparent conductive coating on one surface of a light transparent plate of insulative material, said phosphor layer having a thickness within the range of thickness over which the phosphor material can store a bistable charge image for an indefinite controllable time;

writing means for bombarding said phosphor layer with a writing beam of high velocity electrons to establish a charge image on said phosphor layer by forming areas of different potential on said phosphor layer which are positive and negative of a critical voltage, and to produce a light image corresponding to said charge image;

holding means for bombarding said phosphor layer with low velocity electrons whose overall effect is to add more electrons to the negative target areas and to remove electrons from the positive target areas by secondary emission so that said negative areas are driven to a low voltage stable state and said positive areas are driven to a high voltage stable state in order to maintain said charge image after said writing beam stops bombarding said areas;

scanning means for moving a reading electron beam across the surface of the phosphor layer of said target in a regular pattern in order to produce a readout signal on the conductive coating of said target which corresponds to the charge image on said phosphor layer;

monitor means for reproducing the charge images stored on said target; and means connected from the conductive coating of said target to said monitor means for transmitting said readout signal from said target to said monitor means to cause said readout signal to be reproduced on said monitor means.

4. Cathode ray storage apparatus having electrical and optical readout, comprising:

a storage target which includes an integral layer of phosphor material over a light transparent conductive coating on the surface of a light transparent glass plate, said phosphor layer having a thickness within the range of thickness over which the phosphor material can store a bistable charge image for an indefinite controllable time;

writing means for bombarding said phosphor layer with a writing beam of high velocity electrons to establish a charge image on said phosphor layer by forming areas of different potential on said phosphor layer which are positive and negative of a critical voltage, and to produce a light image corresponding to said charge image;

holding means for bombarding said phosphor layer with low velocity electrons whose overall effect is to add electrons to the negative target areas and to remove electrons from the positive target areas in order ot maintain said charge image after said writing beam stops bombarding said areas;

scanning means for moving a reading electron beam across the surface of the phosphor layer of said target in a regular pattern in order to produce an electrical readout signal on the conductive coating of said target which corresponds to the charge image on said phosphor layer;

monitor means for reproducing the charge images stored on said target;

amplifier means connected between the conductive coating of said target and said monitor means for amplifying the electrical readout signal and for transmitting said readout signal from said target to said monitor means to cause said readout signal to be reproduced on said monitor means; and feedback means connected between the output of said amplifier means and said scanning means for modulating the reading beam in accordance with said readout signal to increase the voltage of a charge image initially having a voltage below said critical voltage, until it exceeds said critical voltage and enables the charge image to be stored bistably.

5. An electrical signal readout apparatus for a cathode ray storage tube, comprising:

a cathode ray storage tube having a storage target which includes a light transparent conductive coating divided into a plurality of separate, insulatingly spaced conductive areas which are secured to the inner surface of the face plate of said tube, some of said conductive areas being in the shape of characters, and a storage dielectric layer of secondary emissive phosphor material supported on said face plate over said conductive areas, said dielectric layer having a thickness that is within the critical range of thickness over which said phosphor material can store a bistable charge image for an indefinite controllable time;

writing means for bombarding the surface of said phosphor layer with a writing beam of high velocity electrons to produce a charge image on said phosphor layer by forming regions of different potential on said phosphor layer which are positive and negative of a critical voltage, and to produce a light image corresponding to said charge image;

holding means for bombarding the phosphor layer substantially uniformly with low velocity flood electrons which cause the potential of said negative regions to seek a low voltage stable state near the quiescent D.C. voltage of a cathode employed in said holding means, and cause the potential of said positive regions to seek a high voltage stable state adjacent the quiescent D.C. target voltage applied to said conductive areas when said target voltage is within the stable range of target voltages for said phosphor layer, in order to maintain said charge image and to store it as a bistable charge image after said writing beam stops bombarding said regions;

means for enabling the application of different quiescent D.C. target voltages to each of said conductive areas so that they can be either below, within or above said stable range to cause that portion of the phosphor layer above each of said conductive areas to operate respectively in a nonstorage, storage or completely written condition, said character-shaped conductive areas producing a character-shaped charge pattern and corresponding light image when their bias voltage is above said stable range; and readout means for moving a reading beam of electrons across the surface of said phosphor layer in a predetermined manner in order to scan the charge images on said phosphor layer to produce electrical readout signals on the conductive coating areas of said target which correspond to said charge images.

6. An electrical signal readout apparatus for a cathode ray storage tube, comprising:

a cathode ray storage tube having a storage target which includes a light transparent conductive coating divided into a plurality of separate, insulatingly spaced conductive areas which are secured to the inner surface of the face plate of said tube, some of said conductive areas being in the shape of characters, and a storage dielectric layer of secondary emissive phosphor material supported on said face plate over said conductive areas, said dielectric layer having a thickness over which said phosphor material can store a bistable charge image for an indefinite controllable time;

writing means for bombarding the surface of said phosphor layer with a writing beam of high velocity electrons to produce a charge image on said phosphor layer by forming regions of different potential on said phosphor layer which are positive and negative of a critical voltage, and to produce a light image on said phosphor layer corresponding to said charge image;

holding means for bombarding the phosphor layer with low velocity electrons which cause the potential of said negative regions to seek a low voltage stable state near the quiescent D.C. voltage of a cathode employed in said holding means, and cause the potential of said positive regions to seek a high voltage stable state adjacent the quiescent D.C. target voltage of said conductive areas when said target voltage is within the stable range of target voltages, in order to maintain said charge image and to store it as a bistable charge image after said writing beam stops bombarding said regions;

means for enabling the application of different quiescent D.C. target voltages to each of said conductive areas and the variation of said target voltages so that they can either be below, within or above the stable range of target voltages to cause that portion of the phosphor layer above each of said conductive areas to operate, respectively, in either a nonstorage, storage or completely written condition, said character-shaped conductive areas producing a character-shaped charge pattern and corresponding light image on said phosphor layer when their target voltage is above said stable range;

scanning means for moving a reading beam of electrons across the surface of said phosphor layer in a predetermined manner in order to scan the charge images on said phosphor layer to produce electrical readout signals on the conductive coating areas of said target which correspond to said charge image; and monitor means for transmitting said readout signals to a monitor device which reproduces the images produced on said target.

7. An electrical signal readout apparatus for a storage tube in a cathode ray oscilloscope, comprising:

a cathode ray storage tube having a storage target which includes a light transparent conductive coating divided into a plurality of separate, insulatingly spaced conductive areas which are secured to the inner surface of the face plate of said tube, some of said conductive areas being in the shape of characters corresponding to different positions of a switch in said oscilloscope, and a storage dielectric layer of secondary emissive phosphor material supported on said face plate over said conductive areas, said dielectric layer having a thickness that is within the critical range of thickness over which said phosphor material can store a bistable charge image for an indefinite controllable time;

writing means for bombarding the surface of said phosphor layer with a writing beam of high velocity electrons to produce a charge image on said phosphor layer by forming regions of different potential on said phosphor layer which are positive and negative of a critical voltage, and to produce a light image corresponding to said charge image;

holding means for bombarding the phosphor layer substantially uniformly with low velocity flood electrons to cause the potential of said negative regions to seek a low voltage stable state near the quiescent D.C. voltage of a flood gun cathode employed in said holding means, and to cause the potential of said positive regions to seek a high voltage stable state adjacent the quiescent D.C. target voltage of said conductive areas when said target voltage is within the stable range of target voltages, in order to maintain said charge image and to store it as a bistable charge image after said writing beam stops bombarding said regions;

means for enabling the application of different quiescent D.C. target voltages to each of said conductive areas and the variation of said target voltages so that they can be either below, within or above the stable range of target voltages to cause that portion of the phosphor layer above each of said conductive areas to operate respectively, in either a nonstorage, storage, or completely written condition, said character-shaped conductive areas producing a character-shaped charge pattern and corresponding light image on said phosphor layer when the character-shaped conductive areas are connected by the switch in said oscilloscope to a target voltage above said stable range; and scanning means for moving a reading beam of electrons inside said storage tube across the surface of said phosphor layer in a predetermined manner in order to scan the charge images on said phosphor layer to produce electrical readout signals on the conductive coating areas of said target which correspond to said charge images; and monitor means for transmitting said readout signals to a monitor cathode ray tube in order to modulate the brightness of the light image produced on said monitor tube while moving its electron beam in synchronism with the reading beam of said storage tube in order to reproduce the charge images formed on said storage target.

8. An electrical signal readout apparatus for a storage tube in a cathode ray oscilloscope, comprising:

a cathode ray storage tube having a storage target which includes a light transparent conductive coating divided into a plurality of separate, insulatingly spaced conductive areas which are secured to the inner surface of the face plate of said tube, some of said conductive areas being in the shape of characters, corresponding to different positions of switches controlling the vertical gain and horizontal sweep speed of said oscilloscope, and a storage dielectric layer of secondary emissive phosphor material supported on said face plate over said conductive areas, at least some portions of said dielectric layer having a thickness that is within the critical range of thickness over which said phosphor material can store a bistable charge image for an indefinite controllable time;

writing means for bombarding the surface of said phosphor layer with a writing beam of high velocity electrons to produce a charge image on said phosphor layer by forming regions of different potential on said phosphor layer which are positive and negative of a critical voltage, and to produce a light image corresponding to said charge image;

holding means for bombarding the phosphor layer substantially uniformly with low velocity flood electrons which cause the potential of said negative regions to seek a low voltage stable state near the quiescent D.C. voltage of a flood gun cathode employed in said holding means, and cause the potential of said positive regions to seek a high voltage stable state adjacent the quiescent D.C. target voltage of said conductive areas when said target voltage is within the stable range of target voltages, in order to maintain said charge image and to store it as a bistable charge image after said writing beam stops bombarding said regions;

means for applying different quiescent D.C. target voltages to each of said conductive areas and for varying said target voltages so that they can be either below, within or above the stable range of target voltages to cause that portion of the phosphor layer above each of said conductive area to operate respectively in a nonstorage, storage or completely written condition, said character-shaped conductive areas producing a character-shaped charge pattern and corresponding light image on said phosphor layer when the character-shaped conductive areas are connected by the switches in said oscilloscope to a target voltage above said stable range; and scanning means for moving a reading beam of electrons inside said storage tube across the surface of said phosphor layer in a predetermined manner in order to scan the charge images on said phosphor layer to produce electrical readout signals on the conductive coating areas of said target which correspond to said charge images without destroying these charge images; and monitor means for amplifying said readout signals and for transmitting them to a monitor cathode ray tube in order to reproduce the charge images as images of a similar configuration on said monitor tube.

9. An electrical signal readout apparatus for a cathode ray storage tube, comprising:
a cathode ray storage tube having a storage target which includes a light transparent conductive coating divided into a plurality of separate, insulatingly spaced conductive areas which are secured to the inner surface of the face plate of said tube, some of said conductive areas being in the shape of characters, and a storage dielectric layer of secondary emissive phosphor material supported on said face plate over said conductive areas, said dielectric layer having a thickness over which said phosphor material can store a bistable charge image for an indefinite controllable time;

writing means for bombarding the surface of said phosphor layer with a writing beam of high velocity electrons to produce a charge image on said phosphor layer by forming regions of different potential on said phosphor layer which are positive and negative of a critical voltage, and to produce a light image on said phosphor layer corresponding to said charge image;

holding means for bombarding the phosphor layer with low velocity electrons which cause the potential of said negative regions to seek a low voltage stable state near the quiescent D.C. voltage of a cathode employed in said holding means, and cause the potential of said positive regions to seek a high voltage stable state adjacent the quiescent D.C. target voltage of said conductive areas when it is within the stable range of target voltages, in order to maintain said charge image and to store it as a bistable charge image after said writing beam stops bombarding said regions;

means for enabling the application of different quiescent D.C. target voltages to each of said conductive areas and the variation of said target voltages so that they can either be below, within or above the stable range of target voltages to cause that portion of the phosphor layer above each of said conductive areas to operate, respectively, in either a nonstorage, storage or completely written condition, said character-shaped conductive areas producing a character-shaped charge pattern and corresponding light image on said phosphor layer when their target voltage is above said stable range;

scanning means for moving a reading beam of electrons across the surface of said phosphor layer in a predetermined manner in order to scan the charge images on said phosphor layer to produce electrical readout signals on the conductive coating areas of said target which correspond to said charge images;

feedback means for transmitting at least a portion of said readout signal to said scanning means in order to modulate said reading beam in accordance with said readout signal so that the charge image of a high frequency transient signal, temporarily formed, but not caused to be permanently stored, by said writing beam on said phosphor layer, is caused to be stored for an indefinite controllable time on said phosphor layer by the scanning action of said reading beam; and monitor means for transmitting said readout signals to a monitor device which reproduces the images produced on said target.

10. A method of operating a bistable cathode ray storage tube, comprising the steps of:
moving a writing beam of high velocity electrons across a storage target in said storage tube in response to an input signal to produce a charge image of said input signal on said target by forming regions of different potential on said target which are positive and negative of a critical voltage;

bombarding said target substantially uniformly with low velocity flood electrons to cause the potential of the negative regions to seek a low voltage stable state, and to cause the potential of the positive regions to seek a high voltage stable state so that said charge image may be stored as a bistable charge image on said target;

scanning said target with a reading beam of electrons in a predetermined manner in order to scan the charge image on said target to produce an electrical readout signal corresponding to said charge image; and modulating said reading beam in response to said readout signal so that a charge image temporarily formed with a voltage between said critical voltage but not caused to be bistably stored by said writing beam on said storage target, is caused to be stored for an indefinite controllable time as a bistable charge image on said target by the scanning action of said reading beam.

11. A method of operating a bistable cathode ray storage tube, comprising the steps of:
moving a writing beam of high velocity electrons across a storage target in said storage tube in response to an input signal to produce a charge image of said input signal on said target by forming regions of different potential on said target which are positive and negative of a critical voltage;

bombarding said target substantially uniformly with low velocity flood electrons to cause the potential of the negative regions to seek a low voltage stable state, and to cause the potential of the positive regions to seek a high voltage stable state so that said charge image may be stored as a bistable charge image on said target;

scanning said target with a reading beam of electrons in a predetermined manner in order to scan the charge image on said target to produce an electrical readout signal corresponding to said charge image;

modulating said reading beam in response to said readout signal so that a charge image temporarily formed with a voltage below said critical voltage but not caused to be bistably stored by said writing beam on said storage target, is caused to be stored for an indefinite controllable time as a bistable charge image on said target by the scanning action of said reading beam; and applying said readout signal to a monitor device for reproducing the charge image on said storage target as another image on said monitor device similar in configuration to said charge image.

12. A method of operating a bistable cathode ray storage apparatus, comprising the steps of:

moving a writing beam of high velocity electrons across a storage target in a first storage tube in response to an input signal to produce a charge image of said input signal on said target by forming regions of different potential on said target which are positive and negative of a critical voltage;

bombarding said target substantially uniformly with low velocity flood electrons to cause the potential of the negative regions to seek a low voltage stable state, and to cause the potential of the positive regions to seek a high voltage stable state so that said charge image may be stored as a bistable charge image on said target;

scanning said target with a reading beam of electrons in a predetermined manner in order to scan a charge image temporarily formed but not bistably stored on said target to produce an electrical readout signal corresponding to said charge image; and transmitting said electrical readout signal corresponding to said temporary charge image to a second cathode ray storage tube so as to cause bistable storage of a second charge image corresponding to said electrical readout signal on said second storage tube device.

13. An electrical signal readout apparatus for a cathode ray storage tube, comprising:

a cathode ray storage tube having a storage target which includes a conductive coating divided into a plurality of separate, insulatingly spaced conductive areas which are secured to a support member within said tube, and a storage dielectric layer of secondary emissive phosphor material supported on said support member over said conductive areas, said dielectric layer having a sufficiently porous structure that secondary electrons emitted from one side of said layer can be transmitted through said layer and collected by said conductive coating on the opposite side thereof so that said phosphor material can store a bistable charge image for an indefinite controllable time;

writing means for bombarding the surface of the phosphor layer with a writing beam of high velocity electrons to produce a charge image on said phosphor layer by forming regions of different potential on said phosphor layer which are positive and negative of critical voltage, and to produce a light image corresponding to said charge image;

holding means for bombarding the phosphor layer substantially uniformly with low velocity electrons to store the charge image as a bistable charge image for an indefinite controllable time when a D.C. voltage within the stable range of target voltages for said phosphor layer is applied to the conductive areas under said charge image;

means for enabling the application of different quiescent D.C. target voltages to each of said conductive areas so that they can be either below, within or above said stable range to cause that portion of the phosphor layer above each of said conductive areas to operate respectively in a nonstorage, storage or completely written condition; and readout means for moving a reading beam of electrons across the surface of said phosphor layer in a predetermined manner in order to scan the charge images on said phosphor layer to produce electrical readout signals on the conductive coating areas of said target which correspond to said charge images.

References Cited by the Examiner
UNITED STATES PATENTS 2,839,679  6/58  Harris _____ 315—12
3,089,055  5/63  Lehrer _____ 315—12

DAVID G. REDINBAUGH, *Primary Examiner.*